United States Patent
Li et al.

(10) Patent No.: US 10,627,664 B2
(45) Date of Patent: Apr. 21, 2020

(54) DISPLAY PANEL, DISPLAY DEVICE AND DISPLAY METHOD

(71) Applicant: BOE TECHNOLOGY GROUP CO., LTD., Beijing (CN)

(72) Inventors: Zhongxiao Li, Beijing (CN); Wenqing Zhao, Beijing (CN); Weili Zhao, Beijing (CN); Haiyan Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/169,058

(22) Filed: Oct. 24, 2018

(65) Prior Publication Data

US 2019/0129239 A1    May 2, 2019

(30) Foreign Application Priority Data

Oct. 26, 2017   (CN) .......................... 2017 1 1012094

(51) Int. Cl.
| | | |
|---|---|---|
| *G02F 1/1335* | (2006.01) | |
| *G02F 1/1343* | (2006.01) | |
| *G02F 1/1333* | (2006.01) | |
| *G02F 1/1362* | (2006.01) | |

(52) U.S. Cl.
CPC .. *G02F 1/133512* (2013.01); *G02F 1/133371* (2013.01); *G02F 1/133514* (2013.01); *G02F 1/133526* (2013.01); *G02F 1/134309* (2013.01); *G02F 1/136209* (2013.01); *G02F 2201/30* (2013.01)

(58) Field of Classification Search
CPC ......... G02F 1/133512; G02F 1/133371; G02F 1/133514; G02F 1/133526; G02F 1/134309; G02F 1/136209; G02F 2201/30; G02F 2001/133565
See application file for complete search history.

(56) References Cited

U.S. PATENT DOCUMENTS

2015/0042926 A1\*   2/2015   Akasaka ........... G02F 1/133526
349/95

FOREIGN PATENT DOCUMENTS

CN          106990604 A        7/2017

\* cited by examiner

*Primary Examiner* — Nathanael R Briggs
(74) *Attorney, Agent, or Firm* — Brooks Kushman P.C.

(57) ABSTRACT

A display panel, a display device, and a display method are provided. A first light-shielding layer and a grating layer are arranged on a first base to form an array substrate of the display panel, a second light-shielding layer and a lens structure layer are arranged on a second base to form an opposite substrate of the display panel, grooves recessed toward the second base are arranged on the lens structure layer, the first light-shielding layer includes first light-shielding regions and first gap regions which are alternately arranged, the first gap regions are within orthographic projections of the grooves onto the first light-shielding layer, the second light-shielding layer includes second blocking regions and second gap regions which are alternately arranged, and a projection of an apex of the curved surface of the groove onto the second blocking layer is located in the second blocking region.

12 Claims, 4 Drawing Sheets

DISPLAY PANEL, DISPLAY DEVICE AND DISPLAY METHOD

CROSS-REFERENCE TO RELATED APPLICATION

This application claims priority to Chinese Patent Application No. 201711012094.4 filed on Oct. 26, 2017, which is incorporated herein by reference in its entirety.

TECHNICAL FIELD

The present disclosure relates to the field of display technologies, and in particular, to a display panel, a display device and a display method.

BACKGROUND

With the advancement of science and technology and the improvement of display technology, liquid crystal display (LCD) devices have increasingly entered people's lives and work because of their low power consumption, low cost, no radiation and easy operation, and been widely used in various fields, like homes, public places, offices and personal electronic related products.

In a liquid crystal display device in the related art, a liquid crystal layer is interposed between a thin film transistor array substrate and a color filter substrate, and then two upper and lower polarizers are arranged on the outer side of the thin film transistor array substrate and the color filter substrate, and the polarization directions of the upper and lower polarizers are perpendicular to each other. The polarization direction of light is deflected by liquid crystal for display. However, as manufacturing cost of polarizers is high and precision is highly required, the use of polarizers not only increases the cost of a display device, but also reduces the reliability of the display device.

SUMMARY

The present disclosure provides a display panel, including an array substrate, an opposite substrate opposite to the array substrate and a liquid crystal layer between the array substrate and the opposite substrate, the array substrate includes a first base and a first light-shielding layer and a grating layer sequentially arranged on the first base, the opposite substrate includes a second base and a second light-shielding layer and a lens structure layer sequentially arranged on the second base, a surface of the lens structure layer away from the second base includes grooves each having a curved surface, and the grooves are recessed from the surface of the lens structure layer away from the second base toward the second base, the first light-shielding layer includes first light-shielding regions and first gap regions alternately arranged, the first gap regions are within orthographic projections of the grooves onto the first light-shielding layer, the second light-shielding layer includes second light-shielding regions and second gap regions alternately arranged, a projection of an apex of the curved surface of each groove onto the second light-shielding layer is within the corresponding second light-shielding region.

Optionally, the liquid crystal layer has a first refractive index and a second refractive index, the first refractive index is greater than the second refractive index, the first refractive index is the same with a refractive index of the grating layer, and the second refractive index is the same with a refractive index of the lens structure layer.

Optionally, a difference between the first refractive index and the second refractive index is greater than 0.3.

Optionally, a focus of a convex lens formed by the grating layer and the liquid crystal layer is in the second light-shielding region.

Optionally, the surface of the lens structure layer away from the second base and between the curved-surface grooves is a planar surface, and a distance between the surface of the second light-shielding layer away from the second base and the planar surface of the lens structure layer away from the second base and between the curved-surface grooves is equal to a focal length of the convex lens formed by the grating layer and the liquid crystal layer.

Optionally, the display panel further includes a planarization layer and a first electrode layer between the first base and the grating layer and sequentially arranged in a direction away from the first base, where at least a portion of the planarization layer is between the first light-shielding region and the first electrode layer, and the first gap regions are filled by the planarization layer.

Optionally, a thickness of the liquid crystal layer is greater than a thickness of the grating layer.

A display device including the above display panel is further provided in the present disclosure.

Optionally, the display device further includes a backlight module, where the backlight module is at a side of the array substrate of the display panel away from the opposite substrate of the display panel, and the backlight module is configured to emit collimated polarized light.

A display method, is further provided in the present disclosure, applied to the above display device and including controlling the display device to be in a display state or a non-display state, and further including: in the display state, applying a voltage to a first electrode layer and a second electrode layer of the display panel, where a refractive index of the liquid crystal layer is a second refractive index, and light emitted from the backlight module and passing through the grating layer is in a diverging state and then emitted out from the second gap region; in the non-display state, applying no voltage to the first electrode layer and the second electrode layer of the display panel, where the refractive index of the liquid crystal layer is a first refractive index, and the light emitted from the backlight module and passing through the convex lens formed by the grating layer and the liquid crystal layer is concentrated in the second shading region.

BRIEF DESCRIPTION OF THE DRAWINGS

In order to more clearly illustrate the technical solutions of some embodiments of the present disclosure, the drawings to be used in the description of some embodiments of the present disclosure will be briefly described below. It is obvious that the drawings in the following description only concern some embodiments of the present disclosure. Those of ordinary skill in the art can obtain other drawings according to these drawings without paying creative labor.

DETAILED DESCRIPTION

The technical solutions in some embodiments of the present disclosure will be clearly and completely described below in conjunction with the accompanying drawings in some embodiments of the present disclosure. It is obvious that the described embodiments are a part of the embodiments of the present disclosure, rather than all of the embodiments. All other embodiments obtained by those of ordinary skill in the art based on the embodiments of the present disclosure without creative labor fall within the scope of protection of the present disclosure.

Figure 1:
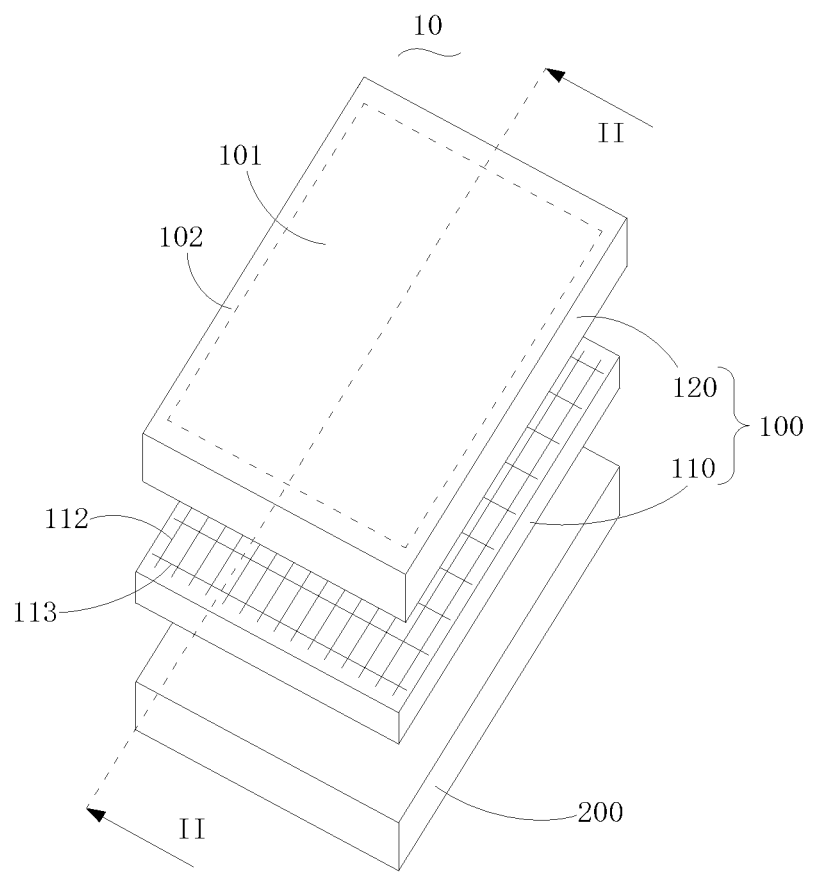
FIG. 1 is a perspective view of a display device in some embodiments of the present disclosure.

Refer to FIG. 1, which is a perspective view of a display device in some embodiments of the present disclosure. As shown in FIG. 1, a display device 10 is provided in some embodiments of the present disclosure, including a display panel 100 and a backlight module 200, the display panel 100 and the backlight module 200 are stacked, the display panel 100 includes an array substrate 110 and an opposite substrate 120, the array substrate 110 and the opposite substrate 120 are arranged opposite to each other, a liquid crystal layer 130 (shown in FIG. 2) is arranged between the array substrate 110 and the opposite substrate 120, so as to implement a display function of the display device 10. The backlight module 200 is at a side of the opposite substrate 120 away from the array substrate 110. The display device 10 further includes a display region 101 and a peripheral region 102 surrounding the display region 101, the display region 101 is mainly configured to implement a display output function of the display device 10, and the peripheral region 102 is mainly used for wiring and the like.

In some embodiments of the present disclosure, the light emitted by the backlight module 200 is collimated polarized light.

The array substrate 110 includes a first base 111, data lines 112, and gate lines 113, the data lines 112 and the gate line 113 are located on the first base 111, the data line 112 extends in a first direction on the first base 111, a plurality of data lines 112 are arranged in parallel in a second direction, the gate lines 113 extends in a second direction on the first base 111, and a plurality of gate lines 113 are arranged in parallel in the first direction.

Orthographic projections of the data lines 112 onto the first base 111 and orthographic projections of the gate lines 113 onto the first base 111 cross each other and correspondingly form, in the display region 101 of the display device 10, a plurality of sub-pixel regions arranged in a matrix, and each of the sub-pixel regions is further provided with a thin film transistor connected to the data line 112 and the gate line 113.

The liquid crystal layer 130 has a first refractive index and a second refractive index, the first refractive index is greater than the second refractive index, where the first refractive index is a refractive index when the polarization direction of liquid crystal molecules in the liquid crystal layer is parallel to a major axis of the liquid crystal molecules, and the second refractive index is a refractive index when the polarization direction of liquid crystal molecules is perpendicular to a major axis of the liquid crystal molecules.

In some embodiments of the present disclosure, a difference between the first refractive index and the second refractive index is greater than 0.3.

Figure 2:
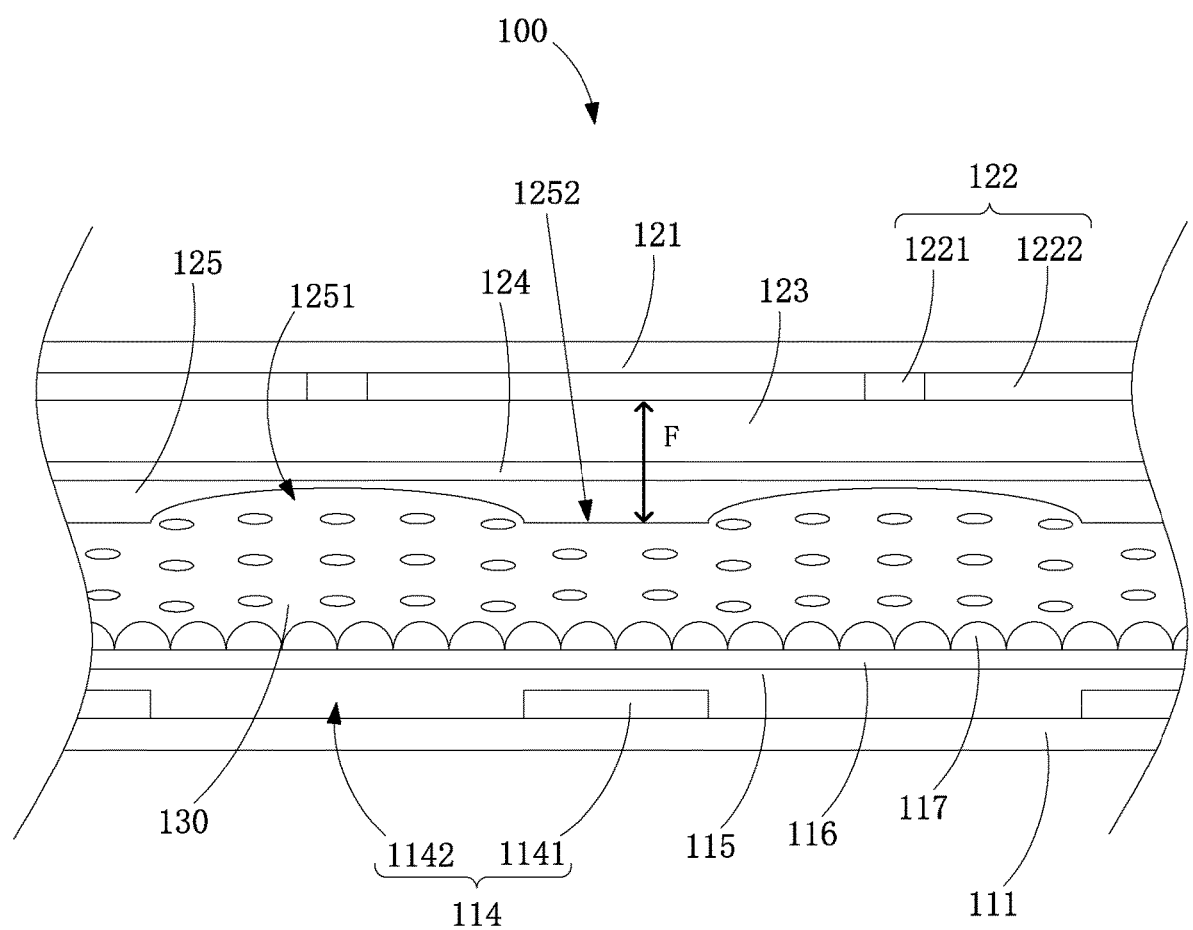
FIG. 2 is a partial cross-sectional view of the display panel shown at the II-II portion of FIG. 1.

Also refer to FIG. 2, which is a partial cross-sectional view of a display panel shown at II-II of FIG. 1. As shown in FIG. 2, the array substrate 110 includes a first light-shielding layer 114, a planarization layer 115, a first electrode layer 116, and a grating layer 117. The first light-shielding layer 114, the planarization layer 115, the first electrode layer 116 and the grating layer 117 are at a side of the first base 111 close to the liquid crystal layer 130, the first light-shielding layer 114 is located between the planarization layer 115 and the first base 111, the planarization layer 115 is located between the first light-shielding layer 114 and the first electrode layer 116, and the first electrode layer 116 is located between the planarization layer 115 and the grating layer 117.

The first light-shielding layer 114 includes first light-shielding regions 1141 and first gap regions 1142, and the first light-shielding regions 1141 and the first gap regions 1142 are alternately provided. In some embodiments of the present disclosure, a black matrix formed by a black photoresist is provided in the first light-shielding region 1141, the first gap region 1142 is a blank region, and the first gap region 1142 is filled by a part of the planarization layer 115. However, the present invention is not limited thereto. In other embodiments, the first gap region 1142 may be filled with a transparent insulating material and forms, together with the first light-shielding region 1141 formed by a black matrix, a flat film layer.

In some embodiments of the present disclosure, the first electrode layer 116 is a pixel electrode layer.

The refractive index of the grating layer 117 is the same with the first refractive index of the liquid crystal layer 130. When the refractive index of the liquid crystal layer 130 is the first refractive index, a propagation path of light does not change either when the light enters the liquid crystal layer 130 via the grating layer 117, or when the light enters the grating layer 117 via the liquid crystal layer 130, and thus the grating layer 117 and the liquid crystal layer 130 may be considered as a single film layer.

The opposite substrate 120 includes a second base 121, a second light-shielding layer 122, an insulating layer 123, a second electrode layer 124, and a lens structure layer 125. The second light-shielding layer 122, the insulating layer 123, the second electrode layer 124 and the lens structure layer 125 are located on the second base 121, the second light-shielding layer 122 is located between the second base 121 and the insulating layer 123, the insulating layer 123 is located between the second light-shielding layer 122 and the second electrode layer 124, and the second electrode layer 124 is located between the insulating layer 123 and the lens structure layer 125.

The second light-shielding layer 122 includes second light-shielding regions 1221 and second gap regions 1222, the second light-shielding regions 1221 and the second gap regions 1222 are alternately provided. In some embodiments of the present disclosure, a black matrix formed by a black photoresist is in the second light-shielding region 1221, the second gap region 1222 is a blank region, and the second gap region 1222 is filled with a color filter unit formed by a red photoresist, a green photoresist, and a blue photoresist. Further, the black matrix in the second light-shielding region 1221 and the color filter unit may form a color filter layer of the display device 10. However, the present is not limited thereto. In other embodiments, the second gap region 1222 may be filled with a transparent insulating material and form, together with the second light-shielding region 1221 formed by the black matrix, a flat film layer, and the color filter unit may be arranged in other layers.

In some embodiments of the present disclosure, the second electrode layer 124 is a common electrode layer.

The refractive index of the lens structure layer 125 is the same with the second refractive index of the liquid crystal layer 130. When the refractive index of the liquid crystal layer 130 is the second refractive index, a propagation path of light does not change either when the light enters the lens structure layer 125 via the liquid crystal layer 130, or when the light enters the liquid crystal layer 130 via the lens structure layer 125, and thus the grating layer 117 and the liquid crystal layer 130 may be considered as a single film layer.

The lens structure layer 125 is provided with grooves 1251 of which bottom surfaces are curved, and the grooves 1251 are recessed in a direction toward the second base 121 from the surface of the lens structure layer 125 away from the second base 121. In some embodiments of the present disclosure, the shape of the groove 1251 is a half ellipse divided along a major axis of an ellipse, and a bottom surface of the groove 1251 is a smooth curved surface.

An orthographic projection of an apex of the curved surface of the groove 1251 onto the second light-shielding layer 122 is located on the second light-shielding region 1221, and an orthographic projection of the groove 1251 onto the first light-shielding layer 114 covers the first gap region 1142, that is, the first gap region 1142 is located within an orthographic projection of the groove 1251 onto the first light-shielding layer 114.

As the lens structure layer 125 is provided with the grooves 1251, the lens structure layer 125 may be equivalent to a concave lens. Correspondingly, as liquid crystal molecules in the liquid crystal layer 130 are filled in the grooves 1251, and the liquid crystal layer 130 may be equivalent to a convex lens. When the refractive index of the liquid crystal layer 130 is the first refractive index, that is, when the refractive index of the liquid crystal layer 130 is the same with the refractive index of the grating layer 117, the liquid crystal layer 130 and the grating layer 117 are equivalent to a single film layer, and can together form a convex lens to converge light. In order to shield the light, the second light-shielding layer 122 should be located on a focal plane of a convex lens formed by the liquid crystal layer 130 and the grating layer 117, that is, the distance between the second light-shielding layer 122 and the lens structure layer 125 should be equal to a focal length of the convex lens formed by the liquid crystal layer 130 and the grating layer 117, and since the second light-shielding region 1221 in the second light-shielding layer 122 may shield the light, the second light-shielding region 1221 is correspondingly located at the focus of the convex lens formed by the liquid crystal layer 130 and the grating layer 117.

In some embodiments of the present disclosure, as shown in FIG. 2, the surface of the lens structure layer 125 away from the second base 121 and between the curved-surface grooves 1251 is a planar surface 1252, and a distance F between the surface of the second light-shielding layer 122 away from the second base 121 and the planar surface 1252 between the curved-surface grooves 1251 on the surface of the lens structure layer 125 away from the second base 122 is equal to the focal length of a convex lens formed by the grating layer and the liquid crystal layer.

Correspondingly, as the same groove 1251 is used, the convex lens formed by the liquid crystal layer 130 cooperates with the concave lens formed by the lens structure layer 125. When the refractive index of the liquid crystal layer 130 is the second refractive index, the liquid crystal layer 130 and the lens structure layer 125 are equivalent to a single film layer. In this case, the lens formed by the liquid crystal layer 130 and the lens structure layer 125 is equivalent to a parallel flat plate, and when the light passes through the parallel flat plate formed by the liquid crystal layer 130 and the lens structure layer 125, the direction of propagation does not change. Only the grating layer 117 changes the direction of propagation of light. In order for sufficient liquid crystal distribution between the grating layer 117 and the lens structure layer 125, thickness of the liquid crystal layer 130 is greater than thickness of the grating layer 117.

Figure 3:
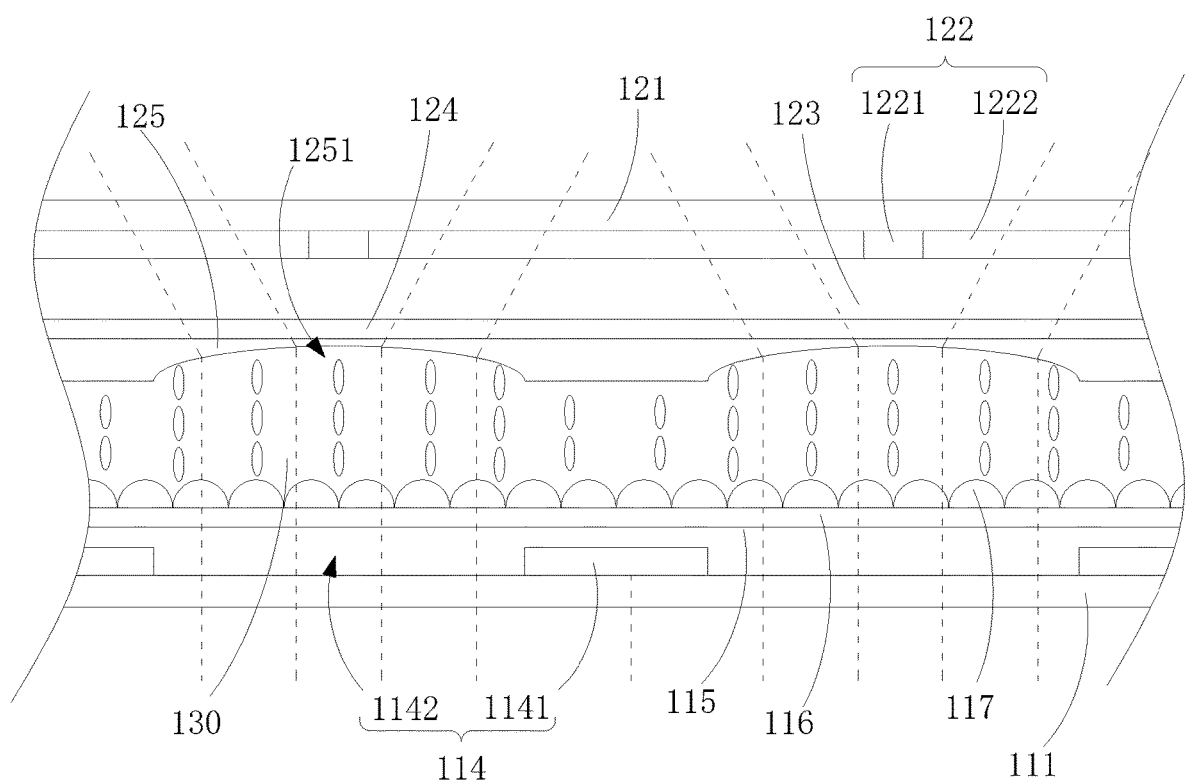
FIG. 3 is a schematic diagram of light propagation of the display panel shown in FIG. 2.
Figure 4:
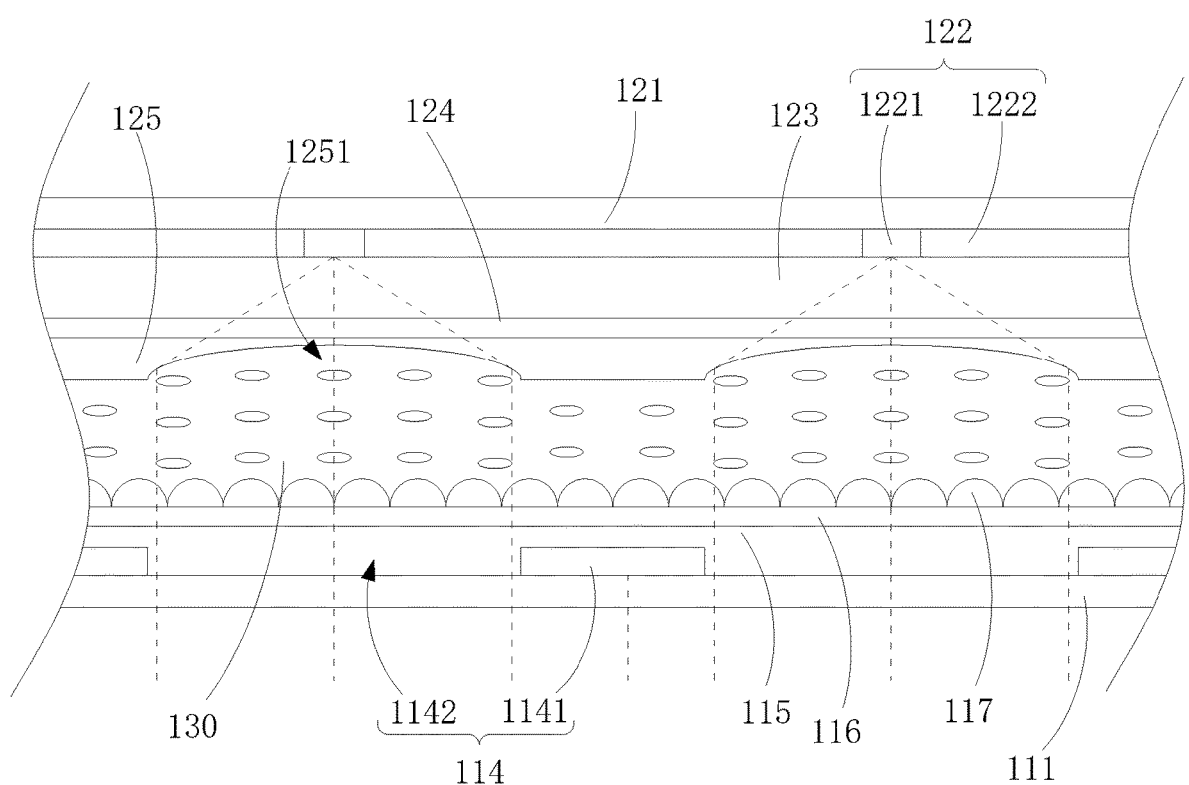
FIG. 4 is another schematic diagram of light propagation of the display panel shown in FIG. 2.

Further, refer to FIG. 3 and FIG. 4 at the same time, wherein FIG. 3 is a schematic diagram of light propagation of the display panel shown in FIG. 2, and FIG. 4 is another schematic diagram of light propagation of the display panel shown in FIG. 2. As shown in FIGS. 2 and 3, a display method is further provided in some embodiments of the present disclosure, applied to the display device 10 described above so as to control the display device 10 to be in a display state or a non-display state.

Specifically, when the display device 10 is controlled to be in a display state, a voltage is applied to the first electrode layer 116 and the second electrode layer 124 of the display panel 100, that is, a voltage is applied to pixel electrodes and common electrodes of the display panel 100. Under the control of an electric field formed between the first electrode layer 116 and the second electrode layer 124, the liquid crystal molecules in the liquid crystal layer 130 are in a first deflected state, the refractive index of the liquid crystal layer 130 is the second refractive index, the liquid crystal layer 130 and the lens structure layer 125 form a parallel flat plate. The collimated polarized light (shown by broken lines in FIG. 3) is emitted from the backlight module 200 to the display panel 100. Due to the first light-shielding region 1141, only the light correspondingly passing through the first gap region 1142 becomes incident light entering the display panel 100, and the incident light is diverged after passing through the grating layer 117 and then emitted out from the second gap region 1222 and passes through the color filter unit to form a display image.

When the display device 10 is controlled to be in a non-display state, no voltage is applied to the first electrode layer 116 and the second electrode layer 124 of the display panel 100, that is, no voltage is applied to the pixel electrodes and the common electrodes of the display panel 100. The liquid crystal molecules in the liquid crystal layer 130 are in a second deflected state. In this case, the refractive index of the liquid crystal layer 130 is a first refractive index, and the liquid crystal layer 130 and the grating layer 117 form a convex lens. The collimated polarized light (shown by the broken lines in FIG. 4) is emitted from the backlight module 200 to the display panel 100. Due to the blocking effect of the first light-shielding region 1141, only the light correspondingly passing through the first gap region 1142 becomes incident light entering the display panel 100, and the incident light is in a concentrated state after passing through a convex lens formed by the liquid crystal layer 130 and the grating layer 117, and is concentrated on the second light-shielding region 1221 and blocked by the black matrix in the second light-shielding region 1221, so that the display device 10 is in a non-display state.

According to the display panel, the display device and the display method, the display panel includes an array substrate, an opposite substrate provided opposite to the array substrate, and a liquid crystal layer interposed between the array substrate and the opposite substrate. The array substrate includes a first base and a first light-shielding layer and a grating layer sequentially arranged on the first base. The opposite substrate includes a second base and a second light-shielding layer and a lens structure layer sequentially arranged on the second base. Grooves having a curved surface as a bottom surface are arranged on the lens structure layer, and the grooves are formed by a recess of the surface of the lens structure layer away from the second base toward the second base. The first light-shielding layer includes first light-shielding regions and first gap regions alternately provided, and the first gap regions are located within orthographic projections of the grooves on the first light-shielding layer. The second light-shielding layer includes second light-shielding regions and second gap regions alternately provided, and a projection of an apex of the curved surface of the groove on the second light-shielding layer is located in the second light-shielding region. In this way, the array substrate of the display panel is formed by providing the first light-shielding layer and the grating layer on the first base, and the opposite substrate of the display panel is formed by providing the second light-shielding layer and the lens structure layer on the second base, wherein grooves recessed toward the second base are arranged on the lens structure layer, the first light-shielding layer includes first light-shielding regions and first gap regions alternately provided, the first gap regions are located within the orthographic projections of the grooves on the first light-shielding layer; the second light-shielding layer includes second light-shielding regions and second gap regions alternately provided, and a projection of an apex of the curved surface of the groove on the second light-shielding region is located in the second light-shielding region. Hence, by providing the light-shielding layer on both the upper and lower substrates and designing the position of the light-shielding layers to fit the liquid crystal layer, the grating layer and the lens structure layer to realize the modulation of the direction of light propagation, the present disclosure realizes the display function, without the need for polarizers, with low cost, a simple structure and high light transmittance, and can improve the reliability of the display device.

The above description concerns only specific embodiments of the present disclosure, but the scope of protection of the present disclosure is not limited thereto, and any change or substitution easily conceivable to a person skilled in the art within the technical scope of the present disclosure should be covered within the scope of protection of the present disclosure. Therefore, the scope of protection of the present disclosure should be determined by the appended claims.

What is claimed is:

1. A display panel, comprising an array substrate, an opposite substrate opposite to the array substrate and a liquid crystal layer between the array substrate and the opposite substrate,
    the array substrate comprises a first base and a first light-shielding layer and a grating layer sequentially arranged on the first base, the opposite substrate comprises a second base and a second light-shielding layer and a lens structure layer sequentially arranged on the second base,
    a surface of the lens structure layer away from the second base comprises grooves each having a curved surface, and the grooves are recessed from the surface of the lens structure layer away from the second base toward the second base,
    the first light-shielding layer comprises first light-shielding regions and first gap regions alternately arranged, the first gap regions are within orthographic projections of the grooves onto the first light-shielding layer,
    the second light-shielding layer comprises second light-shielding regions and second gap regions alternately arranged, a projection of an apex of the curved surface of each groove onto the second light-shielding layer is within the corresponding second light-shielding region, wherein the apex of the curved surface of each groove is a point of the curved surface farthest from the first base;
    wherein the lens structure layer is between the first light-shielding layer and the second light-shielding layer.

2. The display panel according to claim 1, wherein the liquid crystal layer has a first refractive index and a second refractive index, the first refractive index is greater than the second refractive index, the first refractive index is the same with a refractive index of the grating layer, and the second refractive index is the same with a refractive index of the lens structure layer.

3. The display panel according to claim 2, wherein a difference between the first refractive index and the second refractive index is greater than 0.3.

4. The display panel according to claim 1, wherein a focus of a convex lens formed by the grating layer and the liquid crystal layer is in the second light-shielding region.

5. The display panel according to claim 4, wherein the surface of the lens structure layer away from the second base and between the curved-surface grooves is a planar surface, and a distance between the surface of the second light-shielding layer away from the second base and the planar surface of the lens structure layer away from the second base and between the curved-surface grooves is equal to a focal length of the convex lens formed by the grating layer and the liquid crystal layer.

6. The display panel according to claim 1, further comprising a planarization layer and a first electrode layer between the first base and the grating layer and sequentially arranged in a direction away from the first base, wherein
    at least a portion of the planarization layer is between the first light-shielding region and the first electrode layer, and the first gap regions are filled by the planarization layer.

7. The display panel according to claim 1, wherein a thickness of the liquid crystal layer is greater than a thickness of the grating layer.

8. A display device comprising the display panel according to claim 1.

9. The display device according to claim 8, further comprising a backlight module, wherein the backlight module is at a side of the array substrate of the display panel away from the opposite substrate of the display panel, and the backlight module is configured to emit collimated polarized light.

10. A display method, applied to the display device according to claim 8, comprising controlling the display device to be in a display state or a non-display state, and further comprising:
    in the display state, applying a voltage to a first electrode layer and a second electrode layer of the display panel, wherein a refractive index of the liquid crystal layer is a second refractive index, and light emitted from the backlight module and passing through the grating layer is in a diverging state and then emitted out from the second gap region;
    in the non-display state, applying no voltage to the first electrode layer and the second electrode layer of the display panel, wherein the refractive index of the liquid crystal layer is a first refractive index, and the light emitted from the backlight module and passing through the convex lens formed by the grating layer and the liquid crystal layer is concentrated in the second shading region.

11. The display panel according to claim 1, wherein the grating layer is formed by a plurality of convex lenses arranged consecutively.

12. The display panel according to claim 1, wherein a surface of the lens structure layer adjacent to the second base is a planar surface, and there is a planar surface between the grooves on the surface of the lens structure layer away from the second base.

\* \* \* \* \*